(12) United States Patent
Hoshino et al.

(10) Patent No.: US 7,767,083 B2
(45) Date of Patent: Aug. 3, 2010

(54) FLUID TREATMENT ARRANGEMENTS AND METHODS FOR OPERATING FLUID TREATMENT ARRANGEMENTS

(75) Inventors: Tatsuya Hoshino, Ryugasaki (JP); Hisayuki Kataoka, Kashiwa (JP)

(73) Assignee: Pall Corporation, Port Washington, NY (US)

( * ) Notice: Subject to any disclaimer, the term of this patent is extended or adjusted under 35 U.S.C. 154(b) by 456 days.

(21) Appl. No.: 11/578,576

(22) PCT Filed: Apr. 15, 2004

(86) PCT No.: PCT/US2004/011520

§ 371 (c)(1),
(2), (4) Date: Mar. 4, 2008

(87) PCT Pub. No.: WO2005/110575

PCT Pub. Date: Nov. 24, 2005

(65) Prior Publication Data

US 2008/0164220 A1    Jul. 10, 2008

(51) Int. Cl.
*B01D 27/08* (2006.01)
*B01D 35/00* (2006.01)
*B01D 35/30* (2006.01)
*B01D 63/00* (2006.01)
*B01D 65/00* (2006.01)

(52) U.S. Cl. .................. 210/232; 210/650; 210/767; 210/446; 210/447; 210/450; 210/321.6; 55/493; 55/503

(58) Field of Classification Search .............. 210/232, 210/767, 446, 447, 450, 650, 321.6; 55/493, 55/503
See application file for complete search history.

(56) References Cited

U.S. PATENT DOCUMENTS

| | | | |
|---|---|---|---|
| 3,283,907 A | 11/1966 | Whiting | |
| 3,399,776 A * | 9/1968 | Knuth | 210/234 |
| 4,379,053 A | 4/1983 | Brane | |
| 4,529,514 A | 7/1985 | Gruett | |
| 4,529,515 A | 7/1985 | Selz | |
| 4,731,183 A | 3/1988 | Schumacher, II | |
| 5,108,598 A * | 4/1992 | Posner | 210/232 |
| 6,277,277 B1 * | 8/2001 | Jacobi et al. | 210/240 |
| 2001/0045386 A1 | 11/2001 | Stankowski et al. | |

FOREIGN PATENT DOCUMENTS

| | | |
|---|---|---|
| AU | 200210174 A1 * | 2/2002 |
| GB | 1 075 424 | 7/1967 |
| JP | 60-168593 U | 11/1985 |
| JP | 3-115092 U | 11/1991 |
| JP | 5-269311 A | 10/1993 |
| JP | 2594583 Y2 | 2/1999 |
| JP | 2003-136055 A | 5/2003 |
| WO | WO 01/08722 A2 * | 8/2001 |
| WO | WO 01/95993 A2 | 12/2001 |

\* cited by examiner

Primary Examiner—Thomas M Lithgow
(74) Attorney, Agent, or Firm—Leydig, Voit & Mayer, Ltd.

(57) ABSTRACT

Fluid treatment arrangements (10) and methods for operating fluid treatment arrangements (10) may include fluid treatment assemblies (11) and manifold assemblies (12) that direct fluids to and/or from the fluid treatment assemblies (11).

12 Claims, 12 Drawing Sheets

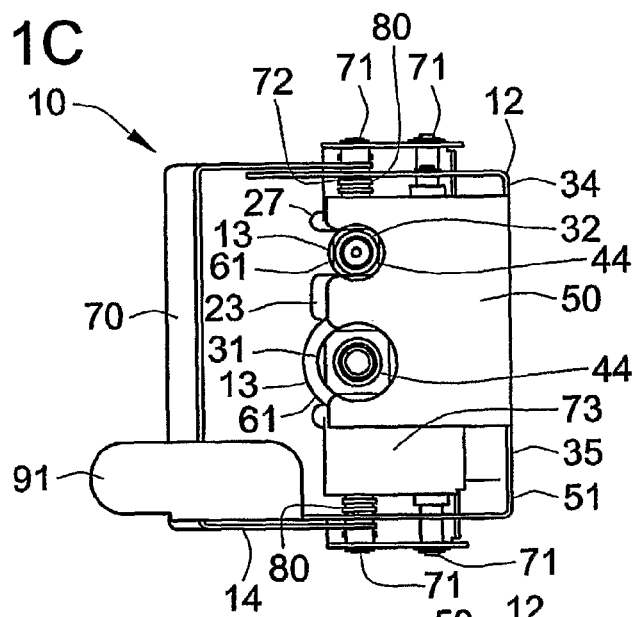
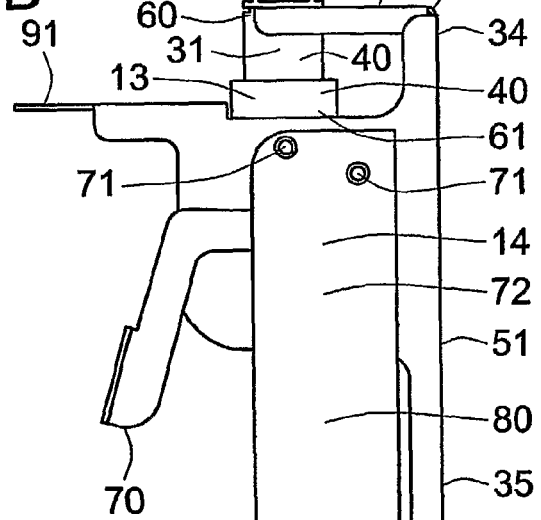
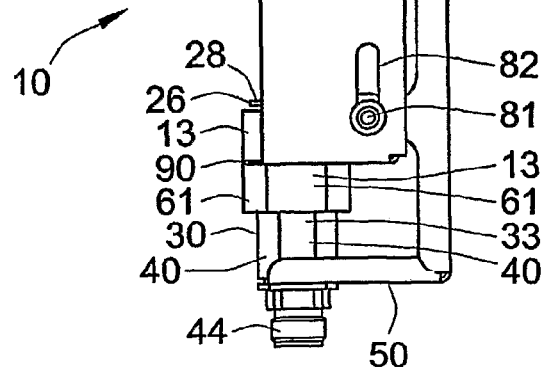

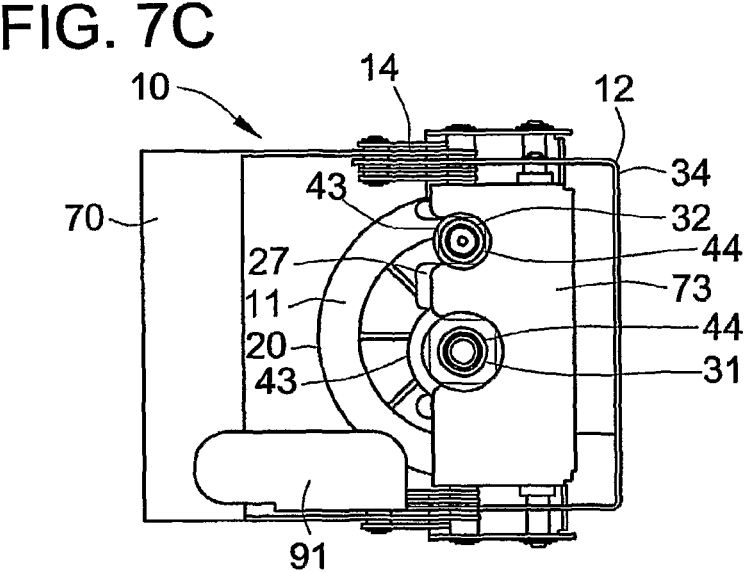
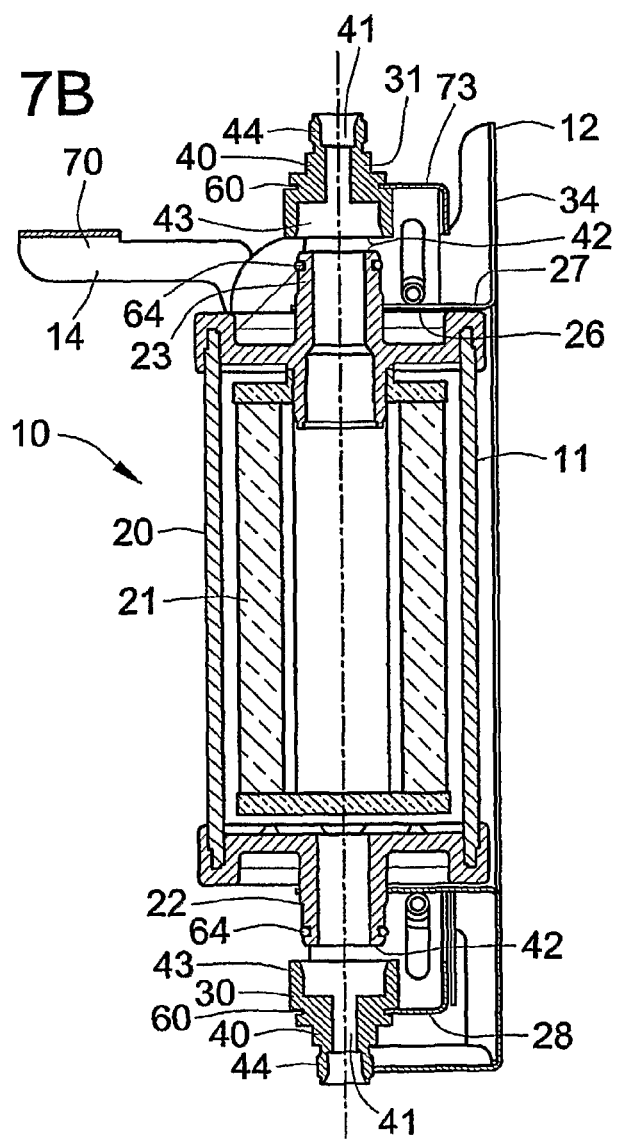

FLUID TREATMENT ARRANGEMENTS AND METHODS FOR OPERATING FLUID TREATMENT ARRANGEMENTS

DISCLOSURE OF THE INVENTION

The present invention relates to fluid treatment arrangements and methods for operating fluid treatment arrangements. In particular, arrangements or methods embodying the invention may include fluid treatment assemblies and manifold assemblies that direct fluids to and/or from the fluid treatment assemblies. The fluids may be gases, liquids, or mixtures of gases, liquids, and/or solids, and the fluid treatment assemblies may be used to treat the fluids in any of a wide variety of ways.

In accordance with one aspect of the invention, fluid treatment arrangements may comprise a fluid treatment assembly, a manifold assembly, and an actuator assembly. The fluid treatment assembly has a first fitting at one end and a second fitting at an opposite end. The manifold assembly has a first fitting and a second fitting. The first fitting of the manifold assembly is disposed at the first end of the fluid treatment assembly and is axially aligned with the first fitting of the fluid treatment assembly. The second fitting of the manifold assembly is disposed at the second end of the fluid treatment assembly and is axially aligned with the second fitting of the fluid treatment assembly. The actuator assembly is cooperatively arranged with the manifold assembly. The actuator assembly includes a mechanism which moves, at the same time or nearly the same time, the first fitting of the manifold assembly linearly towards the first end of the fluid treatment assembly into sealing engagement with the first fitting of the fluid treatment assembly and the second fitting of the manifold assembly linearly towards the opposite second end of the fluid treatment assembly into sealing engagement with the second fitting of the fluid treatment assembly, both in response to movement of the mechanism from a first position to a second position. The mechanism also moves, at the same time or nearly the same the same time, the first fitting of the manifold assembly linearly away from the first end of the fluid treatment assembly out of sealing engagement with the first fitting of the fluid treatment assembly and the second fitting of the manifold assembly linearly away from the opposite second end of the fluid treatment assembly out of sealing engagement with the second fitting of the fluid treatment assembly, both in response to movement of the mechanism from the second position to the first position.

In accordance with another aspect of the invention, methods for operating a fluid treatment arrangement may comprise axially aligning a first fitting at a first end of a fluid treatment assembly with a first fitting of a manifold assembly and axially aligning a second fitting at an opposite second end of the fluid treatment assembly with a second fitting of the manifold assembly. The methods may further comprise moving an actuator assembly between first and second positions. Moving the actuator assembly includes moving, at the same time or nearly the same time, the first fitting of the manifold assembly linearly towards the first end of the fluid treatment assembly into sealing engagement with the first fitting of the fluid treatment assembly and the second fitting of the manifold assembly linearly towards the second opposite end of the fluid treatment assembly into sealing engagement with the second fitting of the fluid treatment assembly, both in response to moving the actuator assembly from the first position to the second position. Moving the actuator assembly further includes moving, at the same time or nearly the same time, the first fitting of the manifold assembly linearly away from the first end of the fluid treatment assembly out of engagement with the first fitting of the fluid treatment assembly and the second fitting of the manifold assembly linearly away from the opposite second end of the fluid treatment assembly out of engagement with the second fitting of the fluid treatment assembly, both in response to moving the actuator assembly from the second position to the first position.

Arrangements and methods embodying these aspects of the invention also have many advantages. For example, these embodiments may be more efficient. A new fluid treatment assembly may be installed very quickly. By simply moving the actuator assembly from the first position to the second position, the fittings at both ends of the fluid treatment assembly are coupled and sealed to the fittings of the manifold assembly at the same time or nearly the same time. By simply moving the actuator assembly from the second position to the first position, the fittings at both ends of the fluid treatment assembly are uncoupled from the fittings of the manifold assembly at the same time or nearly the same time. This reduces downtime and, therefore, increases throughput.

Arrangements and methods embodying the invention may further include one or more fittings of the manifold assembly that are detachably mounted to a support. These embodiments may be more efficient as well as more versatile. One or more fittings of the manifold assembly may become plugged when materials in the fluid flowing through the fittings settle and collect within the channels in the fittings. Because the fittings may be detachably mounted to the support, they can be quickly detached and inspected and, if desired, cleaned and replaced. This reduces downtime, enhances the performance of the fluid treatment arrangement, and increases throughput. Further, fluid treatment assemblies with many different types of fittings may be used with one manifold assembly by simply detaching from the support the fittings of the manifold assembly which are not compatible with the fittings of the fluid treatment assembly and reattaching to the support compatible fittings.

DESCRIPTION OF THE DRAWINGS

FIGS. 1A, 1B, and 1C are elevation, side and top view, respectively, of a fluid treatment arrangement without a fluid treatment assembly.

FIGS. 7A, 7B, and 7C are a sectioned elevation view, a sectioned side view, and a top view of a fluid treatment arrangement with the fittings of the manifold assembly uncoupled from the fittings of the fluid treatment assembly.

DESCRIPTION OF SOME EMBODIMENTS

Figure 1A:
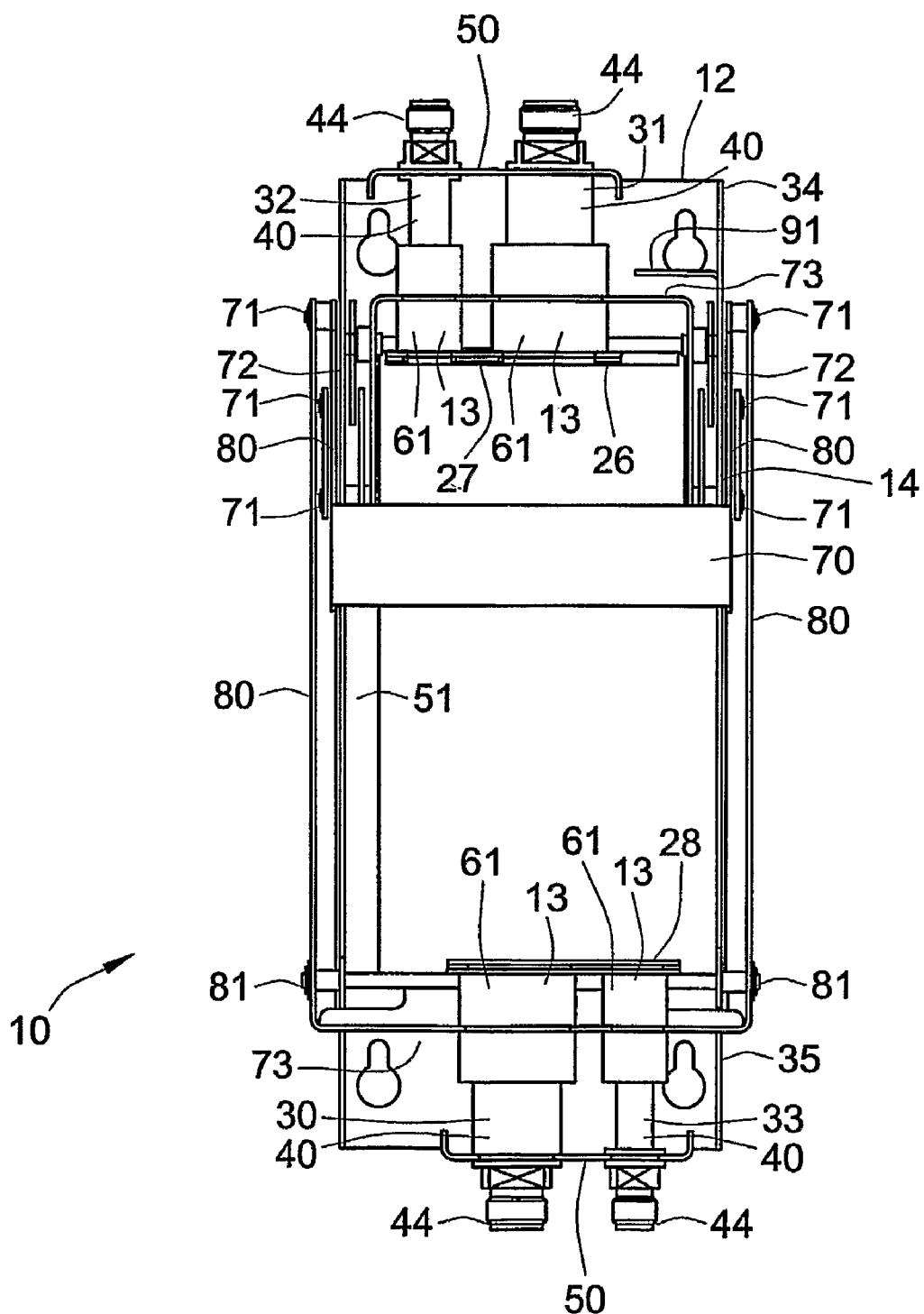
Figure 2A:
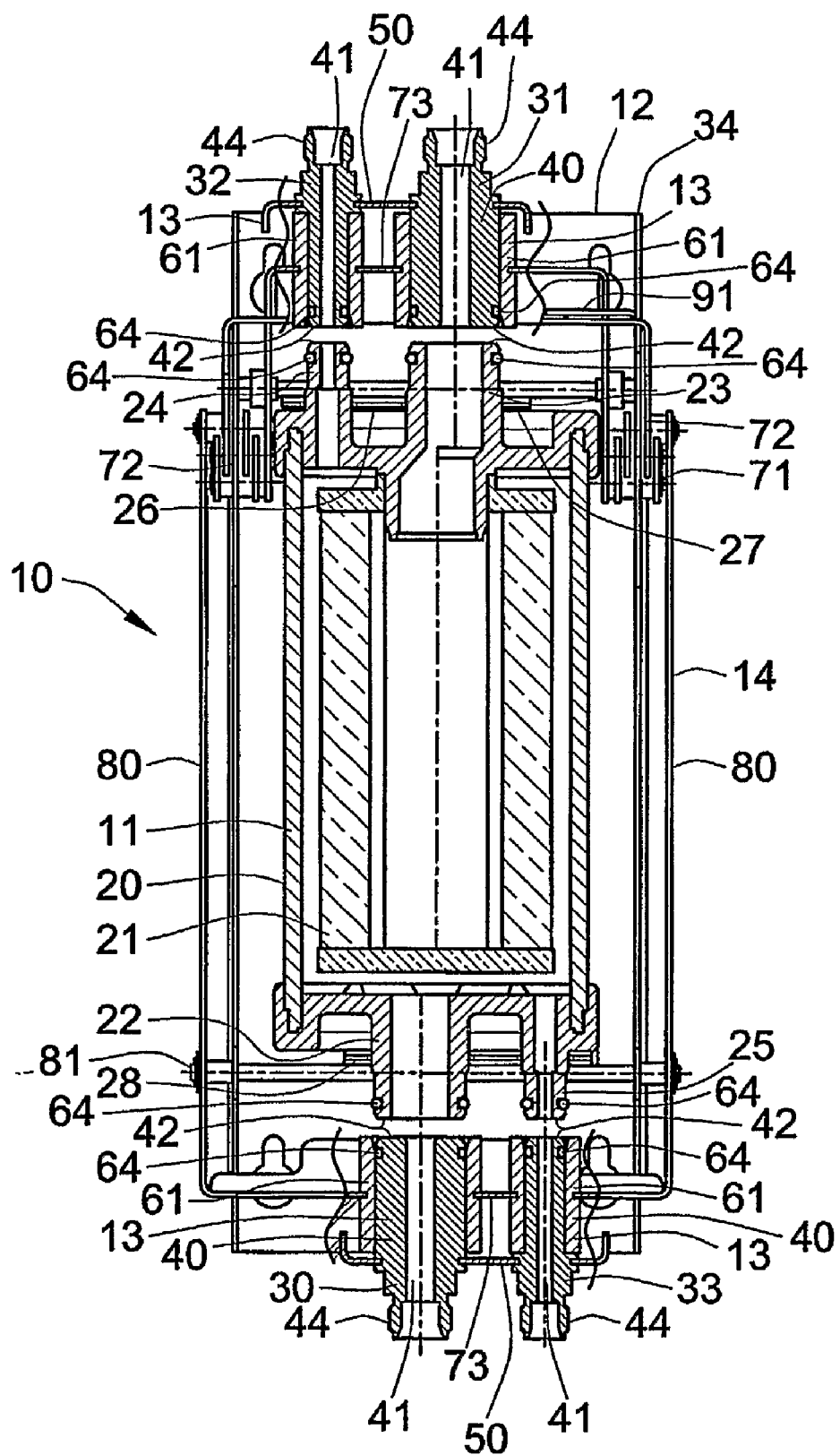
FIGS. 2A, 2B, and 2C are a sectioned elevation view, a sectioned side view, and a top view of a fluid treatment arrangement with the fittings of the manifold assembly uncoupled from the fittings of the fluid treatment assembly.
Figure 2C:
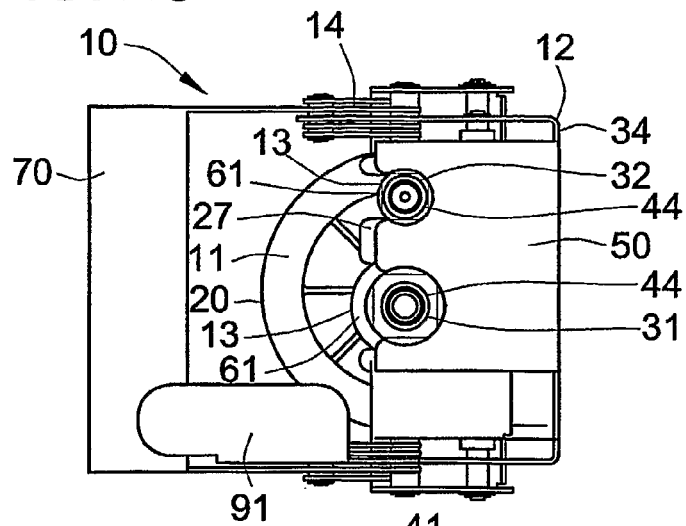
Figure 2B:
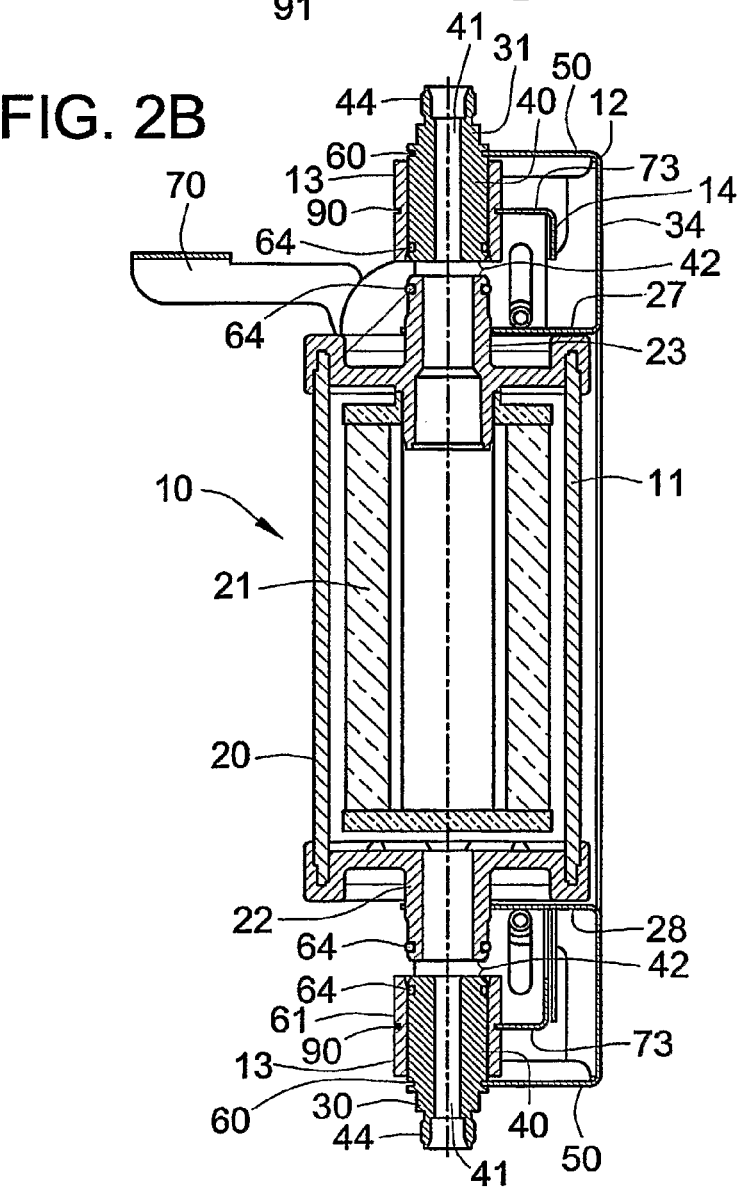
Figure 3A:
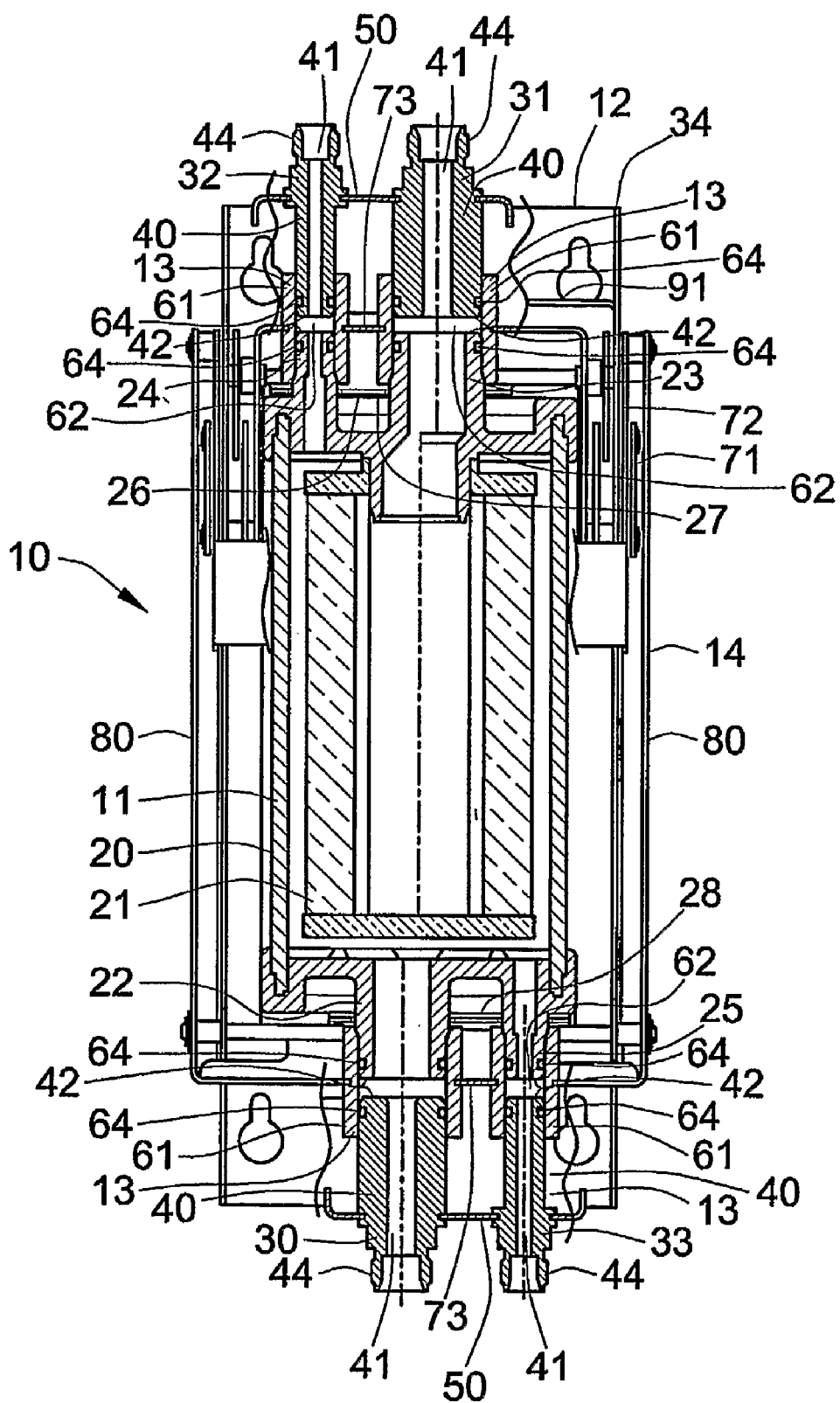
FIGS. 3A, 3B, and 3C are a sectioned elevation view, a sectioned side view, and a top view of a fluid treatment arrangement with the fittings of the manifold assembly and the fluid treatment assembly sealingly coupled to one another.
Figure 3C:
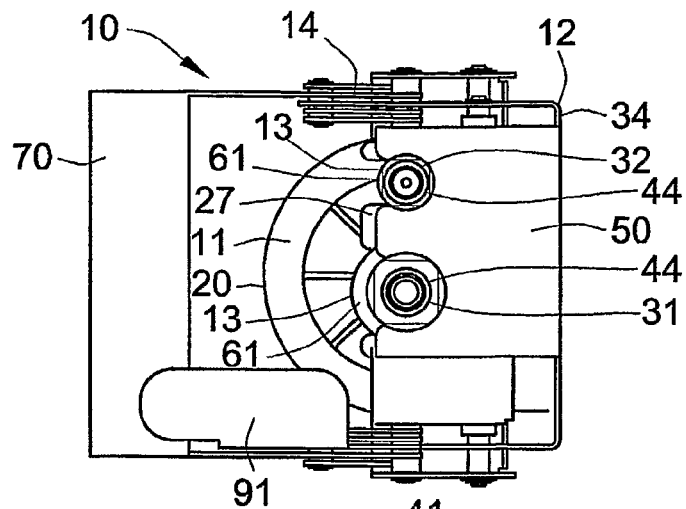
Figure 3B:
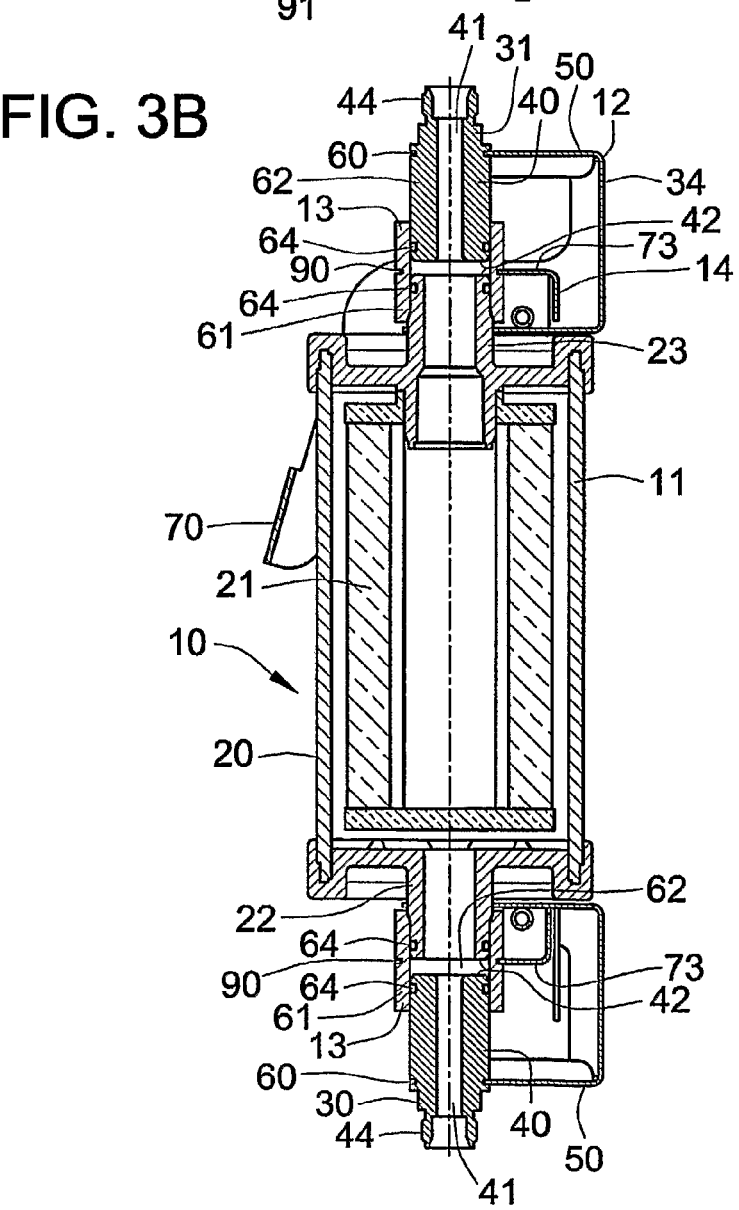
Figure 4A:
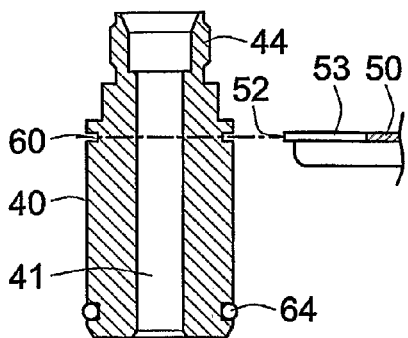
FIGS. 4A and 4B are a sectional elevation view and a sectional plan view of a pair of fittings and a corresponding support.
Figure 4B:
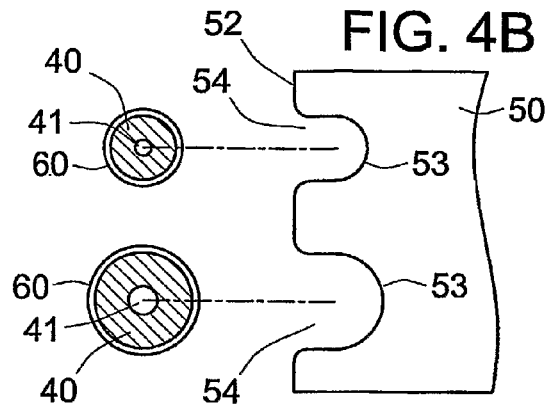

Fluid treatment arrangements which embody one or more aspects of the invention may be structured in a wide variety of ways. One of many examples of a fluid treatment arrangement 10 is shown in FIGS. 1-3. The illustrated fluid treatment arrangement 10 generally comprises a fluid treatment assembly 11, a manifold assembly 12, and an actuator assembly 14.

Fluid treatment assemblies may be structured in any of numerous ways and may have any regular or irregular shape. For example, the fluid treatment assembly 11 may include a housing 20 and a fluid treatment medium 21 permanently or removably positioned in the housing 20 to treat fluid flowing through the housing 20. The housing has one or more fittings. For example, the housing 20 may have an inlet fitting 22 and at least one outlet fitting 23 which define a fluid flow path through the fluid treatment assembly 11. The inlet and outlet fittings 22, 23 may be positioned at opposite ends of the housing 20, as shown in the illustrated embodiment. Alternatively, the inlet and outlet fittings may be positioned at various locations on the housing. For example, all of the fittings may be positioned at one end of the housing. Examples of fluid treatment assemblies having fittings at one end of the housing are disclosed in International Publication No. WO 01/95993 A2, which is incorporated by reference in its entirety. In addition to the inlet and outlet fittings, the fluid treatment assembly may include other fittings, e.g., another outlet fitting (not shown) or a vent fitting 24 or a drain fitting 25.

Fluid treatment assemblies may be used to treat a fluid in any of numerous ways. For many embodiments, the fluid treatment assembly may be used in a separation process to separate one or more substances from a fluid. For example, the separation process may involve particle filtration, where particles of a predetermined size may be excluded from the fluid by the fluid treatment medium. The fluid treatment medium may then comprise any suitable porous filtration medium, such as a microfiltration, ultrafiltration, or nanofiltration medium. Alternatively, the separation process may involve chemical separation, where one or more ions or charged or uncharged chemical compounds, including molecules, may be excluded from, or concentrated in, a fluid by the fluid treatment medium. The fluid treatment medium may then comprise any suitable permeable or semipermeable membrane or any suitable capture medium which, for example, physically or chemically binds the ions or compounds.

The fluid treatment assembly may be configured for any desired fluid flow mode. For example, the fluid treatment assembly 11 may be configured in a dead end flow mode, where the fluid treatment medium 21 is positioned across the fluid flow path through the housing 20. Fluid directed into the inlet fitting 22 passes along the fluid flow path through the fluid treatment medium 21 to the outlet fitting 23.

Alternatively, the fluid treatment assembly may be configured in a cross flow mode, where the housing has an inlet fitting and first and second outlet fittings and defines first and second fluid flow paths. The first fluid flow path extends from the inlet fitting tangentially along the fluid treatment medium to the first outlet fitting, and the second flow path extends from the first flow path through the fluid treatment medium to the second outlet fitting. Fluid directed into the inlet fitting passes along the first flow path. A portion of the fluid, i.e., the filtrate or the permeate, passes along the second fluid flow path through the fluid treatment medium to the second outlet fitting. The remainder of the fluid, i.e., the retentate or the concentrate, continues along the first fluid flow path to the first outlet fitting.

The manifold assembly 12 includes one or more fittings which are arranged to be coupled to some or all of the fittings of the fluid treatment assembly. For example, in the illustrated embodiment, the manifold assembly 11 includes four fittings, i.e., a feed fitting 30, a filtrate fitting 31, a vent fitting 32, and a drain fitting 33, which are respectively couplable to the inlet fitting 22, the outlet fitting 23, the vent fitting 24, the drain fitting 25 of the fluid treatment assembly 11. The fluid treatment assembly may be held in a carriage which aligns the fittings of the fluid treatment assembly with the appropriate fittings of the manifold assembly. The carriage may be variously configured and may be stationary or movable with respect to the manifold assembly. In the illustrated embodiment, the carriage 26 comprises opposed plates 27, 28 attached to the manifold assembly 12 and positioned near the ends of the fluid treatment assembly 11. A registration mechanism ensures that the fittings 22-25 of the fluid treatment arrangement 11 are aligned with the fittings 30-33 of the manifold assembly 12. The registration mechanism may be variously structured. In the illustrated embodiment, the registration mechanism comprises cutouts 29 in which the fittings 22-25 of the fluid treatment assembly 11 may be positioned.

The manifold assembly 12 directs fluids to and/or from the fluid treatment assembly 11 and may serve as an interface between the fluid treatment assembly 11 and the remainder of the fluid system (not shown). The manifold assembly may be structured in a wide variety of ways. For example, the manifold assembly may include a housing which may have any regular or irregular shape and may include internal fluid channels coupled to the fittings of the manifold assembly. However, for many embodiments, the housing 34 of the manifold assembly 12 may simply comprise a bracket 35, and external fluid conduits 36 may be coupled to the fittings 30, 31, 32, and 33.

The fittings of the manifold assembly, as well as the fittings of the fluid treatment assembly, may be variously configured. For many embodiments, the fittings may have a hollow, generally elongate body 40 with a fluid channel 41 extending through the body 40 and a nozzle 42 or a receptacle 43 which receives a nozzle 42 at one end of the body 40. Different types of nozzles and receptacles may have different shapes, some of which are disclosed in International Publication No. WO 01/95993 A2. The opposite end of the fitting body 40 may include a coupling 44, such as a threaded coupling or a swagelok coupling, which is couplable to a fluid conduit (not shown).

The fittings and the housing of the manifold assembly may be configured in any manner which accommodates the fittings of the fluid treatment assembly. For example, the fittings and the housing of the manifold assembly may be arranged to be located at only one end of the fluid treatment assembly if the fittings of the fluid treatment assembly are all at one end. In the illustrated embodiment, the fittings 30-33 and the housing 34 of the manifold assembly 12 are arranged to be disposed at both ends of the fluid treatment assembly 11 to accommodate the fittings 22-25 at both ends. For example, the housing 34 may extend beyond both ends of the fluid treatment assembly 11 and may align the manifold fittings 30-33 with the corresponding fittings 22-25 at each end of the fluid treatment assembly 11.

The fittings of the manifold assembly may be mounted to the housing of the manifold assembly. For example, some or all of the fittings may be permanently mounted to the housing or semipermanently mounted to the housing, i.e., where removal of the fittings requires considerable effort and/or special tools. However, for many embodiments, some or all of the fittings may be detachably mounted to the housing, i.e., where removal of the fittings is relatively easy and entails, at most, the use of ordinary tools such as a screwdriver or a wrench. The fittings may even be directly detachable from the housing, i.e., where removal of the fittings may be effected without the use of any tools.

The fittings of the manifold assembly may be mounted in a variety of ways which allow them to be detached or directly detached. For example, the fittings may be mounted in any number of snap fit arrangements. One example of a snap fit arrangement is shown in FIGS. 1-4. The housing 34 of the manifold assembly 12 may include a support 50 at one or both ends of the bracket 35. The support 50 may extend from and be fixed to a base 51 of the bracket 35. The support 50 may have an outer edge 52 into which one or more cutouts 53, e.g., generally C-shaped cutouts, are formed. Each C-shaped cutout 53 may have a diameter which corresponds to the diameter of the body 40 of the fitting which is intended to occupy the cutout. In addition, the cutout 53 may encompass somewhat more than 180°, which would provide an opening 54 at the outer edge 52 that is somewhat smaller than the diameter of the cutout 53. Alternatively, the cutout may encompass 180° or less, but the fitting may then mount to the cutout without a snap-fit arrangement.

To fit in the cutout 53, the body 40 of the fitting 30-33 may comprise a portion having an outer diameter approximately equal to the diameter of the cutout 53. For example, a groove 60 may be formed in the outer periphery of the fitting body 40, where the width of the groove 60 corresponds to the thickness of the support 50 at the cutout 53 and the depth of the groove 60 provides the appropriate diameter. Alternatively, the outer periphery of the fitting body may provide the appropriate diameter, and spaced, parallel flanges may extend outwardly from the body, forming a groove between them. The distances between the flanges may correspond to the thickness of the support at the cutout 53.

To attach the fitting 30-33 of the manifold assembly 11 to the support 50, for example, to directly attach the fitting 30-33, the fitting 30-33 may simply be slid into the C-shaped cutout 53 with the edge of the support 50 in the groove 60 of the fitting 30-33. The fitting 30-33 may have an outer diameter in the groove 60 which is somewhat larger than the opening 54 at the outer edge 52 of the support 50, and the fitting 30-33 then "snaps" into place as it slides through the narrower opening 54 and is maintained laterally in place by the narrower opening 54. With the edge of the support 50 lodged in the groove 60 of the fitting 30-33, the fitting 30-33 is also locked axially in place with respect to the support 50. Before or after the fitting 30-33 is snapped in place in the cutout 53, a fluid conduit (not shown) may be coupled to the end of the fitting 30-33 with the coupling 44.

To detach the fitting 30-33 from the support 50, for example, to directly detach the fitting 30-33, the fitting 30-33 may simply be forced, for example, by hand, laterally through the opening 54 at the outer edge 52 of the support 50. Before or after the fitting 30-33 is removed from the cutout 53, a fluid conduit (not shown) may be uncoupled from the coupling 44 at the end of the fitting 30-33.

Figure 5A:
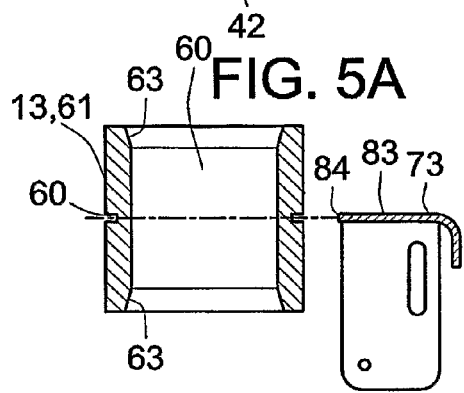
FIGS. 5A and 5B are a sectional elevation view and a sectional plan view of a pair of couplers and a corresponding support.
Figure 5B:
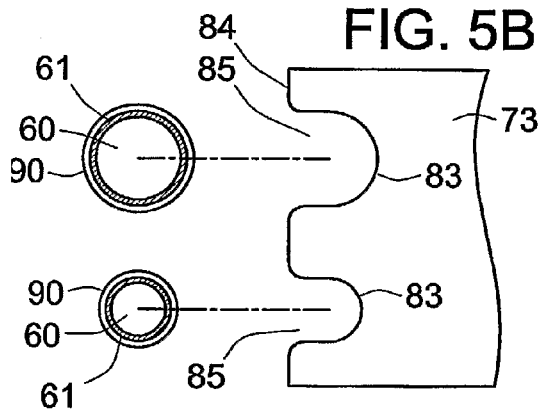

A hollow coupler 13 may be arranged to provide a flow path between aligned fittings of the manifold assembly and the fluid treatment assembly, and the actuator assembly 14 may be arranged to sealingly couple and uncouple the coupler and the aligned fittings. The coupler may be structured in a variety of ways. For example, the coupler may comprise a hollow, elongate body. As shown in FIGS. 5A and 5B, the elongate body may comprise a generally cylindrical sleeve 61, and the sleeve 61 may have a straight bore 62 which defines a channel extending between opposed, tapered ends 63 of the sleeve 61. The inner diameter of the bore 62 corresponds to the outer diameter of the body of the aligned fittings 22-25, 30-33 of the fluid treatment assembly 11 and the manifold assembly 12. As shown in FIGS. 2 and 3, the bodies of each pair of aligned fittings 22-25, 30-33 have substantially equal outer diameters which correspond to the inner diameter of the bore 62 of the sleeve 61. The sleeve 61 and one or both fitting bodies 40 may be arranged to relatively move coaxially with the coupler 13 sliding along the exterior of the bodies 40 to couple and uncouple the aligned pair of fittings. One or more seal rings 64 may be positioned between the bodies 40 of the fittings and sleeve 61 to seal the sleeve 61 to any fitting in the bore 62 of the sleeve 61. Many different types of fittings with many different types of nozzles or receptacles may be accommodated by the same coupler, for example, if the outer diameter of all of the fitting bodies corresponds to the inner diameter of the coupler.

Figure 6A:
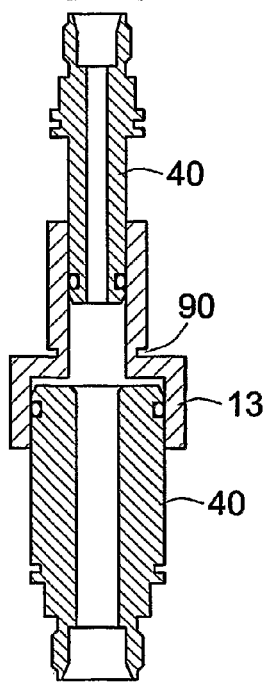
FIGS. 6A, 6B, and 6C are sectional elevation views of couplers and fittings.
Figure 6B:
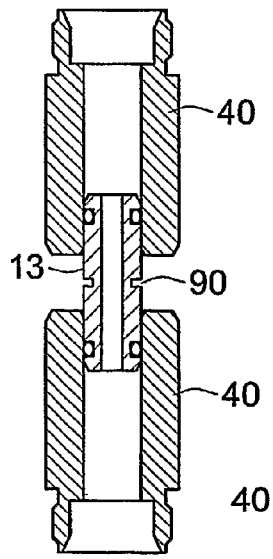
Figure 6C:
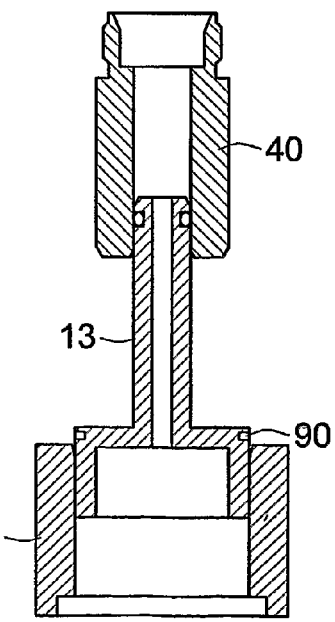

Various examples of differently configured couplers and fittings are shown in FIGS. 6A-6C. For example, as shown in FIG. 6A, the elongate body of the coupler 13 may have a channel with a different inner diameter at each end to accommodate an aligned pair of fittings with bodies 40 having different outer diameters. The coupler 13 and one or both fitting bodies 40 may be arranged to relatively move coaxially, with the coupler 13 sliding along the exterior of the bodies 40, to couple and uncouple the aligned pair of fittings.

As shown in FIGS. 6B and 6C, the coupler 13 may be arranged to fit within the interior, rather than on the exterior, of the bodies 40 of the pair of aligned fittings. The coupler 13 may have the same outer diameter at each end, as shown in FIG. 6B, or a different outer diameter at each end, as shown in FIG. 6C. The coupler 13 and one or both fitting bodies 40 may be arranged to relatively move coaxially, with the coupler 13 sliding along the interior of the bodies 40 to couple and uncouple the aligned pair of fittings.

The actuator assembly 14 may be structured in a wide variety of ways and may be associated with any one or more of the fluid treatment assembly, the manifold assembly, and/or the coupler to couple and uncouple the fittings of the fluid treatment assembly and the manifold assembly. For many embodiments, the coupler and the fittings, or just the fittings, may be moved relative to one another by the actuator assembly in a direction that is substantially coaxial along much or all of the range of movement. The manifold assembly, the actuator assembly, and the carriage may be arranged in any manner, for example, such that the fittings may be stationary while the coupler moves; the coupler may be stationary while the fittings move; the coupler and the fittings of one or both of the fluid treatment assembly and the manifold assembly may move; or the coupler may be eliminated and the fittings of one or both of the fluid treatment assembly and the manifold assembly may move.

Various actuator assemblies may be used to effect this movement. For example, the actuator assembly may be configured as a screw mechanism in which the movement is effected by turning a screw between first and second angular positions. The actuator assembly may be configured as a cam mechanism in which a lever may be rotated between first and second angular positions to effect the movement. As another example, the actuator assembly may be configured as a slide mechanism in which a handle translates linearly between first and second positions to effect the movement.

For many embodiments, the actuator assembly 14 may be configured as a pivoting mechanism in which a handle 70 pivots between first and second positions to effect relative coaxial, linear movement of the fittings 22-25, 30-33 and/or the couplers 13. The pivoting mechanism may be configured in a variety of ways, one example of which is shown in FIGS. 1-3. In addition to the handle 70, the pivoting mechanism of the actuator assembly 14 may include one or more pivot pins 71 and a linkage 72 connected to the handle 70. The linkage may be structured in many different ways depending, for example, on whether there are fittings at only one end or at both ends of the fluid treatment assembly. An example of a linkage 72 that connects slide plates 73 of the actuator assembly 14 at both ends of the fluid treatment assembly 11 to the lever 70 is shown in FIGS. 1-3. The linkage 72 may include any number of links 80, pins 81 and/or rails 82 to effect linear translation of the slide plates 73 in a direction generally parallel to the axes of the fittings 22-25, 30-33 and/or the couplers 13 in response to pivoting movement of the handle 70.

In the embodiment illustrated in FIGS. 1-3, the fittings 22-25, 30-33 of the fluid treatment assembly 11 and the manifold assembly 12 may be stationary, while the couplers 13 may be mounted to the actuator assembly 14, e.g., the slide plates 73, for sliding movement between the fittings 22-25, 30-33. The couplers 13 may be permanently, semipermanently, detachably or directly detachably mounted to the actuator assembly 14 in any number of ways. For many embodiments, the couplers 13 may be detachably, e.g., directly detachably, mounted to the slide plates 73 in a snap-fit arrangement. For example, couplers 13 may be mounted to the slide plates 73 in the same way the fittings 30-33 of the manifold assembly 12 are mounted to the supports 50. Each slide plate 73 may thus include cutouts 83, e.g., C-shaped cutouts, in the outer edge 84 of the plate. The cutouts 83 of the side plates 73, the cutouts 53 of the supports 50, and the cutouts 29 in the end plates 27, 28 may be arranged to coaxially align the couplers 13 and the fittings 22-25, 30-33. The cutouts 83 of the slide plates 73 may also encompass somewhat more than 180°, defining an opening 85 at the outer edge 84 which is smaller than the inner diameter of the cutout 83. The cutouts 83 in the slide plates 73, 74 and the cutouts 53 in the support 50 may be arranged to coaxially align the fittings 30-33 and the corresponding couplers 13. Similarly, the coupler 13 may include a groove 90 in the outer periphery of the sleeve 61 which has an outer diameter corresponding to the inner diameter of the cutout 83 but somewhat smaller than the size of the opening 85 at the outer edge 84 of the plate 73. The width of the groove 90 may correspond to the thickness of the edge of the plate 73. The couplers 13 may thus be snap fit into and out of engagement with the slide plates 73, 74 in the same way the fittings 30-33 of the manifold assembly 12 may be snap-fit into and out of engagement with the supports 50. Once the couplers 13 are engaged in the cutouts 83 of the slide plates 73, the couplers 13 are axially locked to the slide plates 73 and move axially with the slide plates 73.

Fluid treatment arrangements may be used in many different modes of operation. For example, in one mode of operation, a fluid treatment assembly 11 may be positioned in a carriage 26 with the fittings 22-25 aligned with the corresponding fittings 30-33 of the manifold assembly 12, as shown in FIGS. 2A and 2B. The manifold assembly fittings 30-33 may be positioned in the supports 50, and the couplers 13 may be mounted only along the bodies 40 of the manifold assembly fittings 30-33 and positioned in the slide plates 73. The actuator assembly 14 may then be moved between a first position and a second position. For example, the handle 70 may be pivoted between a first position and a second position, e.g., between the raised position shown in FIG. 2B and the lowered position shown in FIG. 3B.

In the first position of the actuator assembly 14, the couplers 13 may be uncoupled from at least one of the fittings 22-25 of the fluid treatment assembly 11 and the fittings 30-33 of the manifold assembly 12, e.g., from the fluid treatment assembly fittings 22-25. In addition, in the first position of the actuator assembly 14, the fittings 22, 24 at one end of the fluid treatment assembly 11 may be uncoupled from the corresponding fittings 30, 32 of the manifold assembly 12, and the fittings 23, 25 at the other end of the fluid treatment arrangement 11 may be uncoupled from the corresponding fittings 31, 33 of the manifold assembly 12.

By moving the actuator assembly 14 to the second position, the couplers 13 sealingly couple the fittings 22-25, 30-33 of the fluid treatment assembly 11 and the manifold assembly 12. In addition, the fittings 22-25 at the opposite ends of the fluid treatment assembly 11 are sealingly coupled to the corresponding fittings 30-33 of the manifold assembly 12 at substantially the same time or soon after one another. For example, as the handle 70 is pivoted to the second position about the pivot pin 71, the linkage 72 may cause the slide plates 73 to translate linearly toward the ends of the fluid treatment assembly 11. The slide plates 73 may then force the sleeves 61 to slide along the bodies 40 of the manifold assembly fittings 30-33, while the supports 50 hold the fittings 30-33 in place. As the slide plates 73 continue to move toward the ends of the fluid treatment assembly 11, one end of each sleeve 61 may slide off the body 40 of each manifold assembly fitting 30-33 and move onto the body 40 of the corresponding fluid treatment assembly fitting 22-25. The tapered end 63 of the sleeve 61 facilitates the insertion of the fluid treatment assembly fitting 22-25 into the bore 62 of the sleeve 61. Once the handle 70 reaches the second position, each sleeve 61 may engage both bodies 40 and the seal rings 64 of the aligned fittings 22-25, 30-33, thereby sealingly coupling all the aligned fittings 22-25, 30-33 at substantially the same time or soon after one another.

Once the fittings 22-25, 30-33 of the fluid treatment assembly 11 and the manifold assembly 12 are sealingly coupled, fluid, e.g., gas, liquid, or a mixture of gases, liquids, and/or solids, may be directed through the fittings 22-25, 30-33. For example, a liquid to be treated may be directed via a feed conduit (not shown) through the feed fitting 30 of the manifold assembly 12 and into the inlet fitting 22 of the fluid treatment assembly 11. The drain conduit (not shown) may be closed so no liquid may pass through the drain fittings 25, 33. As the liquid passes into the housing 20 and through the fluid treatment medium 21, filling the housing 20, the gas originally in the housing 20 may be directed out of the housing 20 ahead of the liquid via the vent fittings 24, 32 and the vent conduit (not shown). Once all of the gas has been vented, the vent conduit may be closed so no liquid flows through the vent fittings 24, 32. Flow of the liquid may then continue for a length of time from the inlet fitting 22 through the fluid treatment 21 to the outlet fitting 23 of the fluid treatment assembly 11 and, hence, to the filtrate fitting 31 and the filtrate conduit (not shown) of the manifold assembly 12.

The remove the fluid treatment assembly 11, flow through the feed line may be terminated and the drain line may be opened, emptying the fluid treatment assembly 11 via the drain fittings 25, 33. All of the conduits may then be closed.

To uncouple the fittings 22-25, 30-33 of the fluid treatment assembly 11 and the manifold assembly 12, the actuator assembly 14 may be moved between the second position and the first position. A handhold or thumb rest 91 may be fixedly attached to the bracket 35 to facilitate raising the pivotable handle 70. For example, the handle 70 may be pivoted from the lowered position to the raised position. As the handle 70 is pivoted to the first position about the pivot pin 71, the linkage 72 may cause the slide plates 73 to translate linearly away from the ends of the fluid treatment assembly 11. The slide plates 73 may then force the sleeves 61 to slide along the bodies 40 of the aligned fittings 22-25, 30-33 away from the ends of the fluid treatment assembly 11. As the slide plates 73 continue to move away from the ends of the fluid treatment assembly 11, each sleeve 61 slides off of the corresponding fitting 22-25 of the fluid treatment assembly 11. Once the handle 70 returns to the raised position, the sleeves 61 are disposed only along the bodies 40 of the manifold assembly fittings 30-33. With the couplers 13 uncoupled form the fittings 22-25 of the fluid treatment assembly 11, the spent fluid treatment assembly 11 may be removed from the carriage 26. A new or cleaned fluid treatment assembly may then be installed as previously described.

For many embodiments, including the embodiment shown in FIGS. 2 and 3, the couplers 13 may sealingly couple the aligned fittings 22-25, 30-33 of the fluid treatment assembly 11 and the manifold assembly 12 without any engagement between the aligned fittings 22-25, 30-33. Although embodiments of the fluid treatment arrangement may be structured to engage the aligned fittings, the lack of engagement has many advantages. For example, because the fittings fail to engage one another, they may be fabricated to much less demanding tolerances and without a complex, e.g., leak-proof, nozzle or receptacle. This lowers cost and increases reliability. Further, because the coupler may sealingly couple the fittings without engagement of the fittings, fittings of many different types, even fittings with mismatched nozzles and/or receptacles, may be used, as long as the fitting bodies have an outer (or inner) diameter corresponding to the inner (or outer) diameter (s) of the coupler. This greatly enhances the versatility of the fluid treatment arrangement.

In addition, for many embodiments, including the embodiment shown in FIGS. 2 and 3, the fittings 22, 24, 23, 25 at both ends of the fluid treatment assembly 11 may sealingly couple to the corresponding manifold assembly fittings 30, 32, 31 and 33 with one movement of the actuator assembly 14 from the first position to the second position. The fittings as both ends may similarly uncouple with one movement of the actuator assembly from the second position to the first position. While fluid treatment arrangements may be configured without this feature, coupling or uncoupling fittings at both ends has several advantages. For example, a spend fluid treatment assembly may be replaced with a new or cleaned fluid treatment assembly very quickly. By simply moving the actuator assembly from the second position to the first position, the fittings at both ends of the fluid treatment assembly may be uncoupled from the corresponding manifold assembly fittings, and the spent fluid treatment assembly can be quickly removed. Similarly, after a new or cleaned fluid treatment assembly is positioned in the carriage, the fittings at both ends of the fluid treatment assembly may be quickly coupled to the corresponding manifold assembly fittings by simply moving the actuator from the first position to the second position. The ability to rapidly replace fluid treatment assemblies reduces downtime and, therefore, increases system throughput.

Further, for many embodiments, including the embodiments shown in FIGS. 2 and 3, the fittings 30-33 of the manifold assembly 12 may be detachably mounted to the supports 50. Similarly, the coupler 13 may be detachably mounted to the slide plates 73. While fluid treatment arrangements may be configured with permanently or semipermanently mounted manifold assembly fittings and couplers, detachably mounting the fittings and/or coupler has many advantages. For example, detachably mounting the fittings and/or couplers allows them to be easily and thoroughly cleaned, refurbished, and reused. Many fluids, including pigmented fluids and suspended dispersions such as photoresists, contain material which can settle and collect in the channels and crevices within the fittings and couplers, plugging them. The manifold assembly fittings 30-33 may be uncoupled from the fluid conduits of the manifold assembly 12 at the coupling 44. The fittings 30-33 and/or the couplers 13 may also be detached, e.g., directly detached, from the supports 50 and the slide plates 73 by forcing them from the cutouts 53, 83 through the openings 54, 85, for example, by hand. The fittings 30-33 and the couplers 13 may then be disassembled and cleaned. Damaged pieces, e.g., seal rings 64, sleeves 61, or fitting bodies 40, may be replaced. The fittings 30-33 and couplers 13 may then be reassembled and reattached to the supports 53 and slide plates 83, e.g., directly reattached by forcing them by hand into the cutouts 53, 83. The fittings 30-33 of the manifold assembly 12 may then be recoupled to the fluid conduits at the couplings 44. Being able to easily, quickly, and thoroughly clean or replace the fittings and the couplers reduces downtime, enhances the performance of the fluid treatment arrangement, and increases throughput.

Detachably mounting the fittings and/or the couplers also significantly enhances the versatility of the fluid treatment arrangements. For example, fluid treatment assemblies with many different types of fittings may be used with one manifold assembly by simply detaching, e.g., directly detaching, incompatible fittings and/or couplers from the supports and/or slide plates and uncoupling the fittings from the fluid conduits of the manifold assembly. Fittings and/or couplers, which are compatible with the fittings of a fluid treatment assembly may then be reattached, e.g., directly reattached, to the supports and/or slide plates. The fittings may be coupled to the fluid conduits of the manifold assembly and the new manifold assembly fittings or couplers may be coupled to the fittings of the fluid treatment assembly. This feature also reduces the inventory of parts maintained for the manifold assembly.

While various aspects of the invention have been previously described and have been illustrated in the figures, the invention is not limited to these embodiments. For instance, one of more of the features of these embodiments may be eliminated without departing from the scope of the invention. For example, the fittings of the fluid treatment arrangement and the manifold assembly at one end of the fluid treatment assembly, e.g., the lower end in FIGS. 1-3, may be eliminated, the remaining fittings being located at only one end of the fluid treatment assembly, e.g., the upper end. The lower portion of the bracket, the lower support, and the lower slide plate, as well as the portion of the linkage associated with the lower slide plate may also be eliminated.

Further, one or more features of one embodiment may be combined with one or more features of other embodiments and/or one or more features of an embodiment may be modified without departing from the scope of the invention. For example, the actuator arrangement, such as the linkage and the slide plates, may be modified to allow the couplers to be disposed only on the fittings of the fluid treatment assembly when the actuator assembly is in the first position and the aligned fittings are uncoupled from one another. Moving the actuator assembly to the second position may then include linearly translating the slide plates away from the end(s) of the fluid treatment assembly and sliding the couplers onto the bodies of the manifold assembly fittings, sealingly coupling the aligned fittings.

Figure 7A:
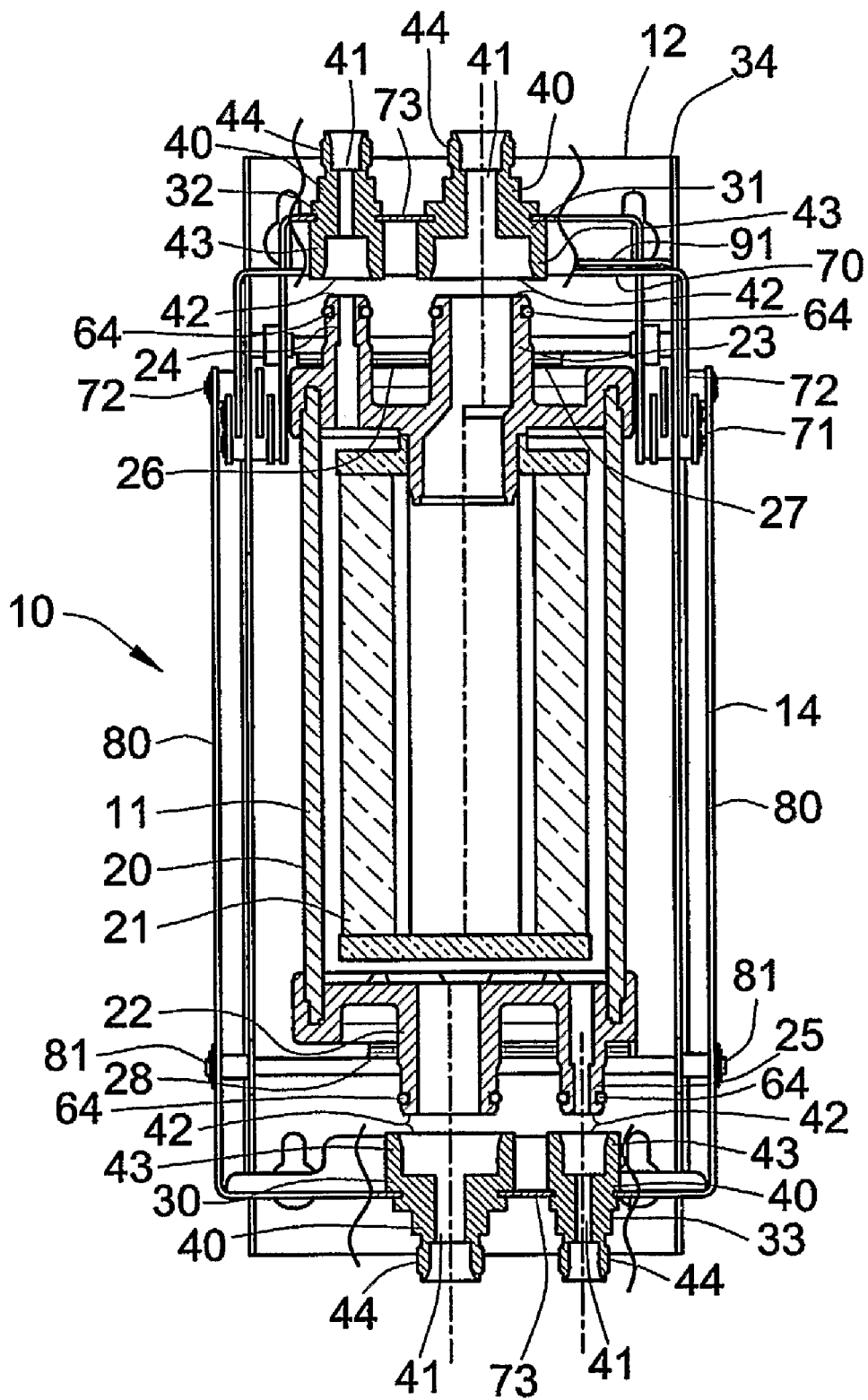
Figure 8A:
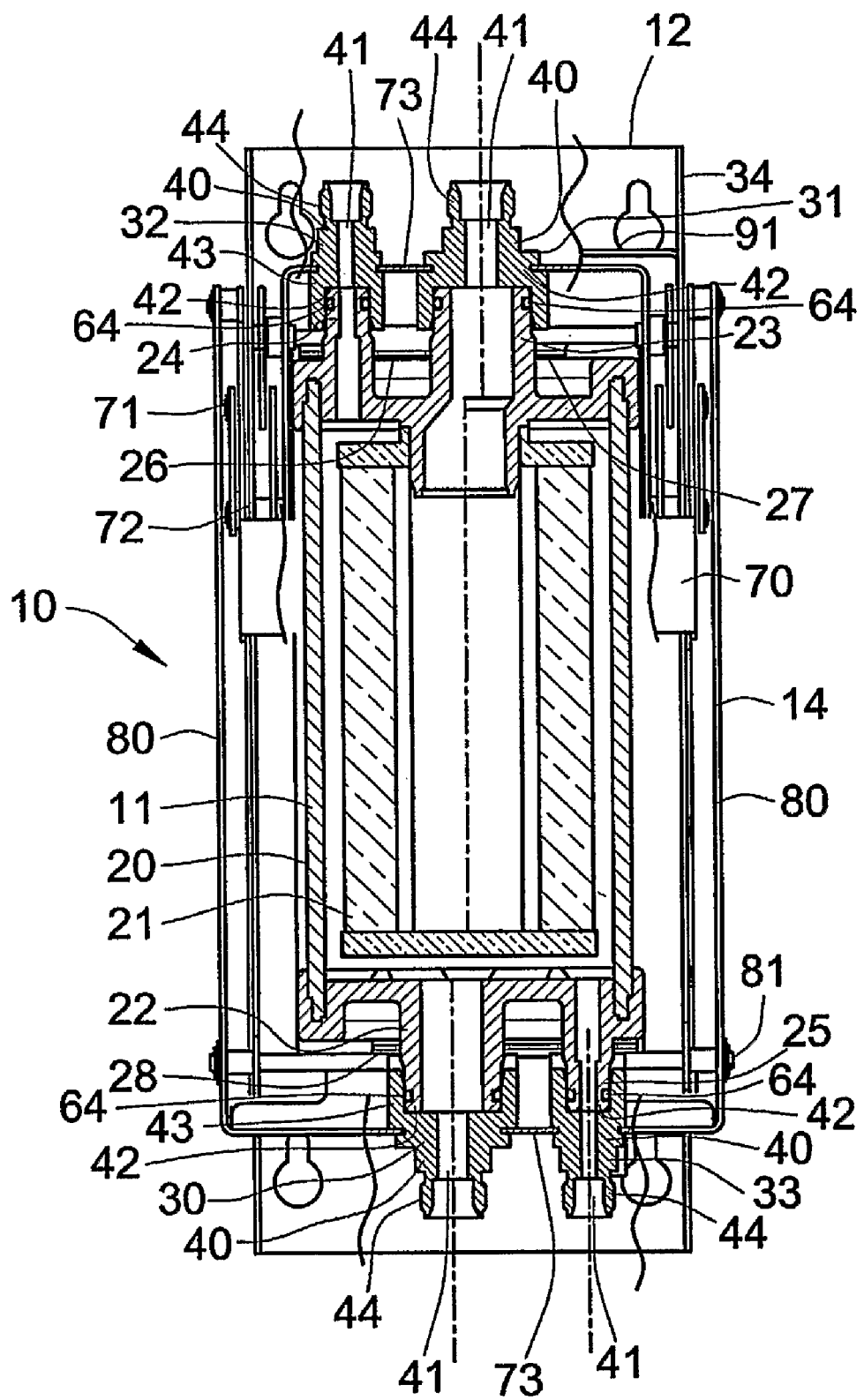
FIGS. 8A, 8B, and 8C are a sectioned elevation view, a sectioned side view, and a top view of a fluid treatment arrangement with the fittings of the manifold assembly and the fittings of the fluid treatment assembly coupled to one another.
Figure 8C:
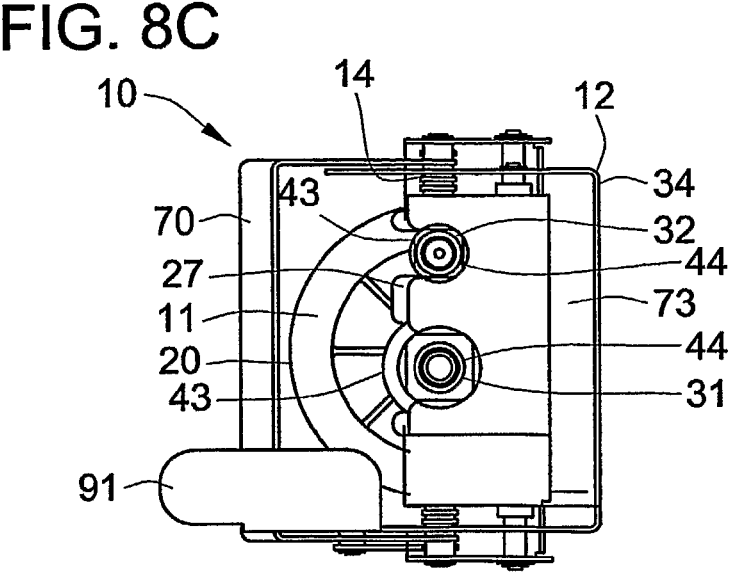
Figure 8B:
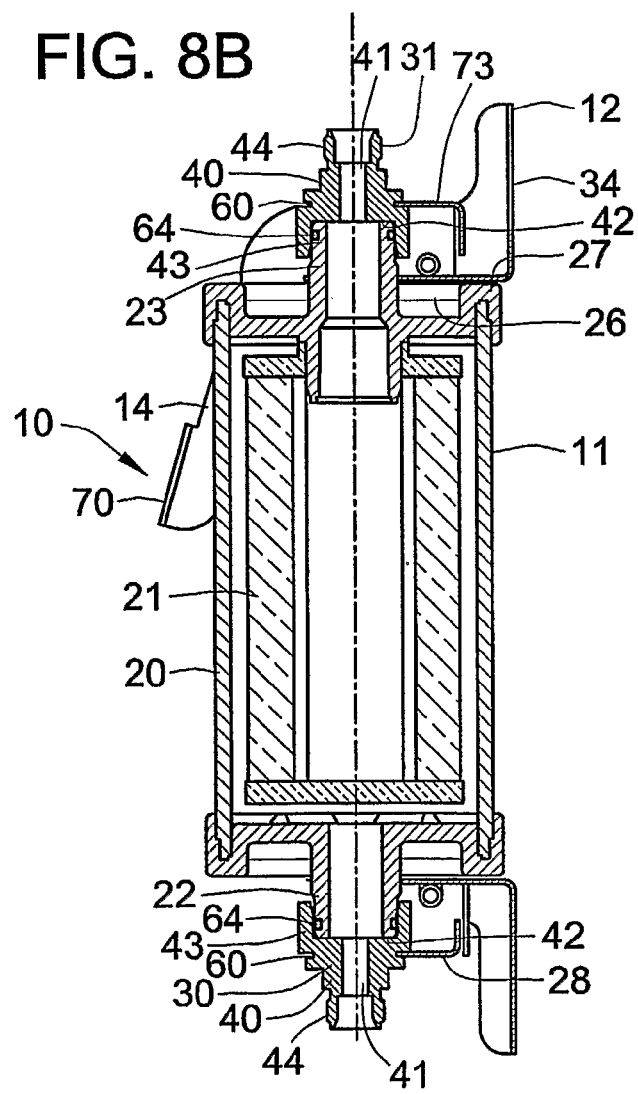

Further, embodiments having different features can still be within the scope of the invention. For example, as shown in FIGS. 7 and 8, a fluid treatment arrangement 10 may be similar to the fluid treatment arrangement 10 shown in FIGS. 2 and 3. (Similar features in both embodiments are identified by the same reference numerals.) However, in the fluid treatment arrangement 10 shown in FIGS. 7 and 8, the actuator assembly 14 couples and uncouples the aligned fittings 22-25, 30-33 without any couplers. For example, the fittings 30-33 of the manifold assembly 12 may be mounted to the actuator assembly 14, including the slide plates 73 of the actuator assembly 14. The slide plates 73 may then serve as the support for the fittings 30-33 of the manifold assembly 12. The manifold assembly fittings 30-33 may be mounted to the actuator assembly 14, e.g., the slide plates 73, permanently, semipermanently, detachably, or directly detachably. For example, the manifold assembly fittings 30-33 may be mounted to the slide plates 73 in a snap fit arrangement similar to that described for the fittings 30-33 and the support 50 in FIGS. 1-3.

The actuator assembly 14 of the fluid treatment arrangement 10 shown in FIGS. 7 and 8 may be moved between a first position and a second position to couple the aligned fittings 22-25, 30-33 and between the second position and the first position to uncouple the aligned fittings 22-25, 30-33. The movement of the actuator assembly 14 in FIGS. 7 and 8 may be similar to the movement of the actuator assembly 14 in FIGS. 2 and 3. However, in the fluid treatment arrangement 10 of FIGS. 7 and 8, the aligned fittings 22-25, 30-33 are sealingly coupled by engaging the fittings 22-25 of the fluid treatment assembly 11 with the corresponding fittings 30-33 of the manifold assembly 12. For example, a nozzle 42 on one of the aligned fittings may be engaged in a corresponding receptacle 43 on the other of the aligned fittings. Uncoupling the aligned fittings includes disengaging the fittings.

Figure 9:
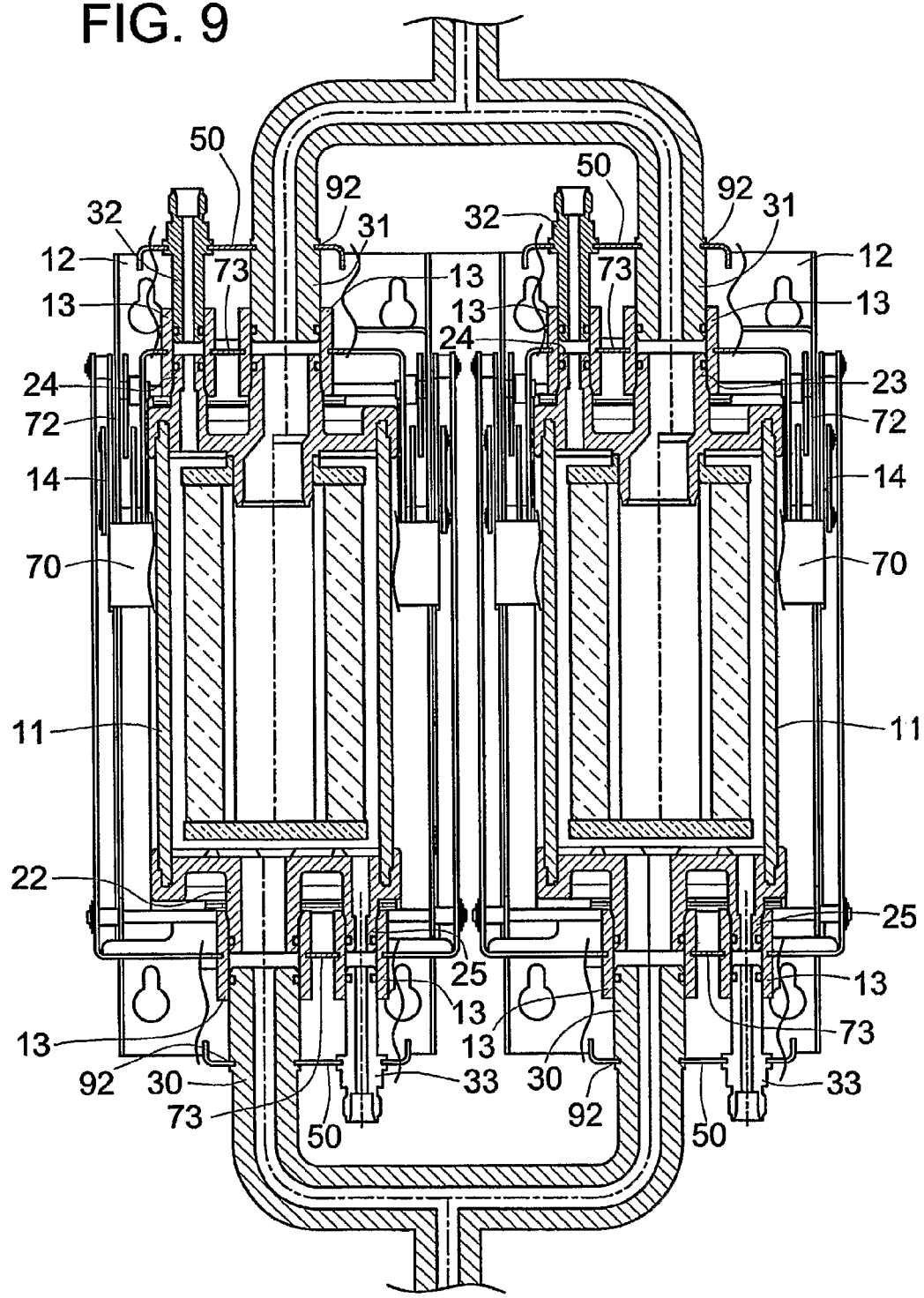
FIG. 9 is a sectioned elevation view of a pair of fluid treatment arrangements connected in parallel.

A fluid treatment arrangement 10 may include a manifold assembly 12 having fittings 30, 31 which are permanently attached to the support 50, as shown in FIG. 9 when FIG. 9, a pair of fluid treatment arrangements 10 are connected in parallel. Alternatively, the pair may be connected in series (not shown). Each fluid treatment arrangement 10 may be similar to the fluid treatment arrangement 10 shown in FIGS. 1-3. (Similar features in both embodiments are identified by the same reference numerals.) However, in each fluid treatment element 10 shown in FIG. 9, two of the fittings 30, 31 of the manifold assembly 12 may be permanently mounted to the support 50, for example, by a weld 92. The operation of the fluid treatment arrangements 10 in FIG. 9 may be similar to the operation of the fluid treatment arrangement 10 in FIGS. 1-3, except two of the fittings 30, 31 of the manifold assembly 12 are not attachable and detachable.

The present invention is thus not restricted to the particular embodiments which are described and illustrated but includes all embodiments and modifications that may fall within the scope of the claims.

What is claimed is:

1. A fluid treatment arrangement comprising a fluid treatment assembly having a first fitting at a first end of the fluid treatment assembly and a second fitting at an opposite second end of the fluid treatment assembly and a manifold assembly having a first fitting and a second fitting, the first fitting of the manifold assembly being disposed at the first end of the fluid treatment assembly and axially aligned with the first fitting of the fluid treatment assembly and the second fitting of the manifold assembly being disposed at the opposite second end of the fluid treatment assembly and axially aligned with the second fitting of the fluid treatment assembly, the fluid treatment arrangement further comprising an actuator assembly cooperatively arranged with the manifold assembly and including a mechanism which moves, at the same time or nearly the same time, the first fitting of the manifold assembly linearly towards the first end of the fluid treatment assembly into sealing engagement with the first fitting of the fluid treatment assembly and the second fitting of the manifold assembly linearly towards the opposite second end of the fluid treatment assembly into sealing engagement with the second fitting of the fluid treatment assembly, both in response to movement of the mechanism from a first position to a second position, and which moves, at the same time or nearly the same time, the first fitting of the manifold assembly linearly away from the first end of the fluid treatment assembly out of sealing engagement with the first fitting of the fluid treatment assembly and the second fitting of the manifold assembly linearly away from the opposite second end of the fluid treatment assembly out of sealing engagement with the second fitting of the fluid treatment assembly, both in response to movement of the mechanism from the second position to the first position.

2. A fluid treatment arrangement as claimed in claim 1 wherein the mechanism of the actuator assembly comprises a pivoting mechanism having a handle, which pivots between the first and second positions and moves both fittings of the manifold assembly.

3. A fluid treatment arrangement as claimed in claim 2 wherein the pivoting mechanism further includes a linkage connected to the handle and arranged to move the fittings of the manifold assembly linearly into and out of engagement with the fittings of the fluid treatment assembly.

4. A fluid treatment arrangement as claimed in claim 1 wherein a fitting of the manifold assembly is detachably mounted to a support.

5. A fluid treatment arrangement as claimed in claim 4 wherein the fitting of the manifold assembly is snap-fit to the support.

6. A fluid treatment arrangement as claimed in claim 4 wherein the fitting of the manifold assembly is axially locked in place on the support and is laterally mountable to and removable from the support.

7. A method for operating a fluid treatment arrangement comprising axially aligning a first fitting at a first end of a fluid treatment assembly with a first fitting of a manifold assembly and axially aligning a second fitting at an opposite second end of the fluid treatment assembly with a second fitting of the manifold assembly, and further comprising moving an actuator assembly between first and second positions, including moving, at the same time or nearly the same time, both the first fitting of the manifold assembly linearly towards the first end of the fluid treatment assembly into sealing engagement with the first fitting of the fluid treatment assembly and the second fitting of the manifold assembly linearly towards the opposite second end of the fluid treatment assembly into sealing engagement with the second fitting of the fluid treatment assembly, both in response to moving the actuator assembly from the first position to the second position, and moving, at the same time or nearly the same time, the first fitting of the manifold assembly linearly away from the first end of the fluid treatment assembly out of engagement with the first fitting of the fluid treatment assembly and the second fitting of the manifold assembly linearly away from the opposite second end of the fluid treatment assembly out of engagement with the second fitting of the fluid treatment assembly, both in response to moving the actuator assembly from the second position to the first position.

8. A method as claimed in claim 7 wherein moving the actuator assembly includes pivoting a handle between the first and second positions to move both fittings of the manifold assembly into and out of engagement with the fittings of the fluid treatment assembly.

9. A method as claimed in claim 7 further comprising detaching a fitting of the manifold assembly from a support and attaching a cleaned or new fitting to the support.

10. A method as claimed in claim 7 further comprising detaching a fitting of the manifold assembly from a support and attaching a different second fitting to the support.

11. A method as claimed in any of claim 7 further comprising attaching a fitting of the manifold assembly to a support by snap-fitting the fitting onto the support.

12. A method as claimed in claim 7 further comprising attaching a fitting or detaching a fitting of the manifold assembly to or from a support by laterally moving the fitting into or out of engagement with the support, attaching the fitting further including axially locking the fitting in place on the support.

* * * * *